(12) United States Patent
McCandlish et al.

(10) Patent No.: US 8,224,112 B2
(45) Date of Patent: *Jul. 17, 2012

(54) FUZZY METHOD TO DETECT THIN LINES IN SCANNED IMAGE

(75) Inventors: Peter McCandlish, Rochester, NY (US); Xing Li, Webster, NY (US); Ryan Metcalfe, Marion, NY (US); Barbara Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 652 days.

This patent is subject to a terminal disclaimer.

(21) Appl. No.: 12/480,247

(22) Filed: Jun. 8, 2009

(65) Prior Publication Data

US 2010/0310178 A1 Dec. 9, 2010

(51) Int. Cl.
*G06K 9/40* (2006.01)
(52) U.S. Cl. ......... 382/266; 382/224; 382/270; 382/205
(58) Field of Classification Search ........................ None
See application file for complete search history.

(56) References Cited

U.S. PATENT DOCUMENTS

| | | | |
|---|---|---|---|
| 5,539,534 A | 7/1996 | Hino et al. | |
| 5,586,200 A | 12/1996 | Devaney et al. | |
| 6,178,260 B1 | 1/2001 | Li et al. | |
| 6,347,153 B1 | 2/2002 | Triplett et al. | |
| 6,707,953 B1 | 3/2004 | Iida | |
| 6,941,014 B2 | 9/2005 | Lin et al. | |
| 7,280,253 B2 | 10/2007 | Li | |
| 7,463,785 B2 | 12/2008 | Ebisawa | |
| 2004/0052428 A1* | 3/2004 | Ebisawa | 382/266 |

* cited by examiner

*Primary Examiner* — Jason M Repko
*Assistant Examiner* — Siamak Harandi
(74) *Attorney, Agent, or Firm* — Pillsbury Winthrop Shaw Pittman LLP

(57) ABSTRACT

Disclosed herein is a method for detecting thin lines in image data. The method is performed by a processor to process contone image data. The processing includes thresholding a window of pixels using a first set of thresholds established in the contone domain, and then counting and thresholding the binary pixels using a second set of thresholds. The processing in the contone and binary domain are used to determine if a thin line exists and if a pixel of interest in the window is an edge pixel that is part of a thin line. The disclosed method produces better quality output images and reduces the addition of false lines in an image.

13 Claims, 10 Drawing Sheets

NOTE: QUALITY OF FIGURE IS LOW ON PURPOSE

NOTE: QUALITY OF FIGURE IS LOW ON PURPOSE

FUZZY METHOD TO DETECT THIN LINES IN SCANNED IMAGE

BACKGROUND

1. Field

The present disclosure is generally related to detecting thin lines in image data.

2. Description of Related Art

Inage data comprises a number of pixels, each pixel corresponding to a defined location in the image. The pixels may have a number of components that contribute to defining the image, such as color and intensity. Binary image data has two possible values for each pixel, black (represented by the number "1") or white (represented by the number "0"). Binary images may also be represented as pixels that are "on" or "off" in color images where pixels are represented by color planes. Images that have a large range of shades are referred to as grayscale image. For example, grayscale images have an 8-bit value (or higher) per pixel comprising 256 tones or shades of gray for each pixel in the image (gray level of 0 to 255). Grayscale image data may also be referred to as continuous tone or contone image data.

A technique for manipulating image data for output includes segmentation (or auto-segmentation). Generally, auto-segmentation techniques are known, and are used to select the most appropriate method to render the various object types (e.g., black and white or color images, text, photos, etc.) present in an image. In some segmentation techniques, separation modules are used to detect and separate text from objects of image data (e.g., photographs or other pictorial parts) so that text image data may be compressed and/or processed differently as compared to the object image data. Image segmentation plays an important role in delivering image quality for copy and scan services. While the technology for image segmentation has been improving over the years, some current methods in use still have limitations in a number of areas—the robustness in thin line detection being one of them. Sometimes, when robust separation of image and text/line art is needed, some kind of two-pass operation, such as auto-windowing, is used. These solutions, however, may not be suitable for all situations due to the cost and complexity associated with them. Also, such methods may not necessarily produce high quality images, as the detection of thin lines may be scarce or eliminated, thus reducing the output quality of the image data. Furthermore, known segmentation methods are sometimes incapable of accurately distinguishing edges from halftone dots or lines.

Therefore, a simpler, yet effective method for manipulating image data for output and for determining thin lines in input image data is desirable.

SUMMARY

An aspect of the disclosure provides a method for detecting thin lines in image data. The method includes receiving contone image data having a plurality of pixels via an input device. The method also includes using a processor to process the image data and determine the presence of thin lines. The processing includes: establishing a window having a pixel of interest and neighboring pixels, as well as a plurality of predetermined regions; determining a minimum value and a maximum value of a selected subset of pixels in the window; thresholding the pixel of interest and neighboring pixels of the window using a first set of thresholds; counting a number of pixels in each of the predetermined regions of the window after applying the first set of thresholds; thresholding the counted number of pixels using a second set of thresholds; determining if a thin line exists in the window based on the thresholding of the counted number of pixels; and classifying the pixel of interest as an edge pixel that is part of a thin line if it is determined that the thin line exists and that the pixel of interest is part of the thin line.

Another aspect of the disclosure includes a system for detecting thin lines in image data. The system includes an input device for receiving contone image data, the image data comprising a plurality of pixels, and a processor configured to process the image data and determine the presence of thin lines. The processor has a thin-line detection module including code executable by the processor for performing a method including: establishing a window comprising a pixel of interest and neighboring pixels, the window having a plurality of predetermined regions; determining a minimum value and a maximum value of a selected subset of pixels in the window; thresholding the pixel of interest and neighboring pixels of the window using a first set of thresholds; counting a number of pixels in each of the predetermined regions of the window after applying the first set of thresholds; thresholding the counted number of pixels using a second set of thresholds; determining if a thin line exists in the window based on the thresholding of the counted number of pixels; and classifying the pixel of interest as an edge pixel that is part of a thin line if it is determined that the thin line exists and that the pixel of interest is part of the thin line.

Yet another aspect of the disclosure includes a computer program product having a computer-usable data carrier storing instructions that, when executed by a computer, cause the computer to perform a method including: establishing a window comprising a pixel of interest and neighboring pixels, the window having a plurality of predetermined regions; determining a minimum value and a maximum value of a selected subset of pixels in the window; thresholding the pixel of interest and neighboring pixels of the window using a first set of thresholds; counting a number of pixels in each of the predetermined regions of the window after applying the first set of thresholds; thresholding the counted number of pixels using a second set of thresholds; determining if a thin line exists in the window based on the thresholding of the counted number of pixels; and classifying the pixel of interest as an edge pixel that is part of a thin line if it is determined that the thin line exists and that the pixel of interest is part of the thin line.

Other features and advantages of the present disclosure will become apparent from the following detailed description, the accompanying drawings, and the appended claims.

BRIEF DESCRIPTION OF THE DRAWINGS

FIG. 1b illustrates a graphical representation of the method of FIG. 1a;

FIGS. 3-6 illustrate a plurality of regions of the window of FIG. 2 for analyzing and processing pixels;

FIG. 10 illustrates an example of an edge map that may be generated after processing the input image of FIG. 8 using the method of FIG. 1a;

FIG. 13 illustrates an example of an edge map that may be generated after processing the input image of FIG. 11 using the method of FIG. 1a.

DETAILED DESCRIPTION

This disclosure proposes a single-pass thin line detection algorithm with improved robustness for image data. As will become further evident in throughout the specification, a "thin line" is defined as pixels of similar value in image data that are provided in a sequence adjacent each other. More specifically, a regular edge or line in an image is defined in this disclosure as having multiple (e.g., more than 2) pixels wide. In some cases, the regular or thicker lines in an image may have pixels approaching a blackpoint minimum of the imaging or scanning device at its darkest point. In an embodiment, it is envisioned that a thin line is defined as comprising fractions that are 1 to 4 pixels (i.e., less than 4 pixels) wide and may be lighter than a regular line. A thin line, therefore—for explanatory purposes in this disclosure—is defined as comprising fractions of a number of pixels wide that are smaller than thicker lines, and, in some cases, may also comprise pixels that are lighter than pixels in a thicker line. The parameters for defining a thin line may be altered or set such that somewhat thicker lines may also be detected. For example, the parameters for a thin line may be set based on the types of lines (and number of pixels wide the lines are) present in the image data, based on the minimum types of points (e.g., such as when pixels are significantly lighter than a minimum point), based on light or dark values of pixels in image data, or based on factors in the type of image data that is generally input. As such, the definition for a thin line should not be limiting.

The method uses multiple adaptively generated thresholds to count the number of "on" pixels in specification regions and in turn detect thin lines of different orientations. It combines features extracted from the contone domain in making the detection decision. If the counts or patterns meet the conditions for a thin line to exist, it is determined if a pixel of interest if part of the thin line. The pixel of interest may be classified as an "edge" pixel or a "non-edge" pixel, such as by tagging the pixel. An "edge" pixel is a pixel in image data that is part of a line in the image data; a "non-edge" pixel is a pixel of image data that is not part of a line in the image data.

The method/algorithm described below includes a plurality of steps as well as a number of variable thresholds. It is to be understood by one in the art that such thresholds and other variables may be programmable parameters, predetermined parameters, or parameters that are determined based on the input image data, and should not be limiting. Further description regarding the variable and/or adaptive thresholds is provided below. The following describes an example of an embodiment.

Figure 1A:
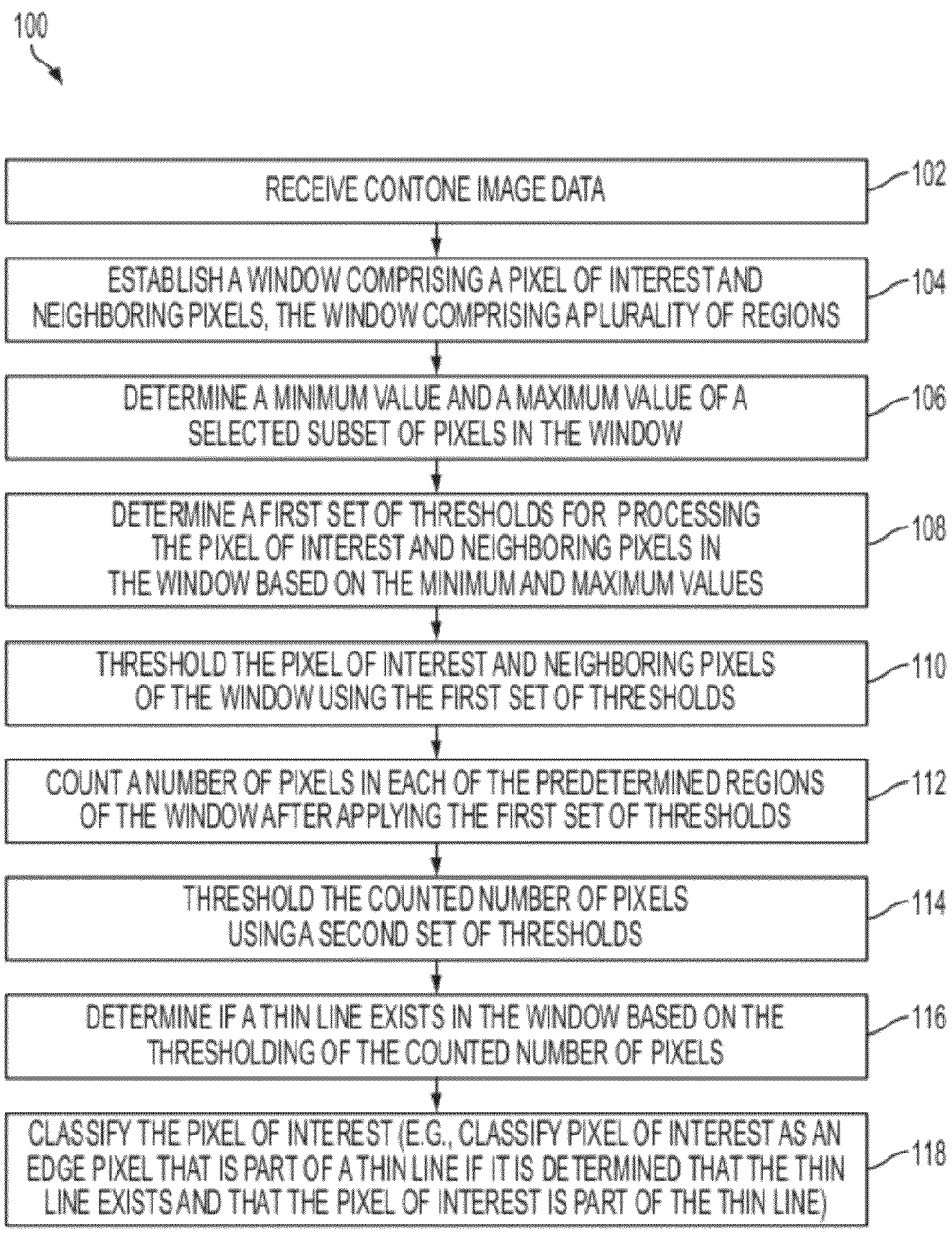
FIG. 1a illustrates a method for detecting thin lines in image data in accordance with an embodiment of the present disclosure.
Figure 2:
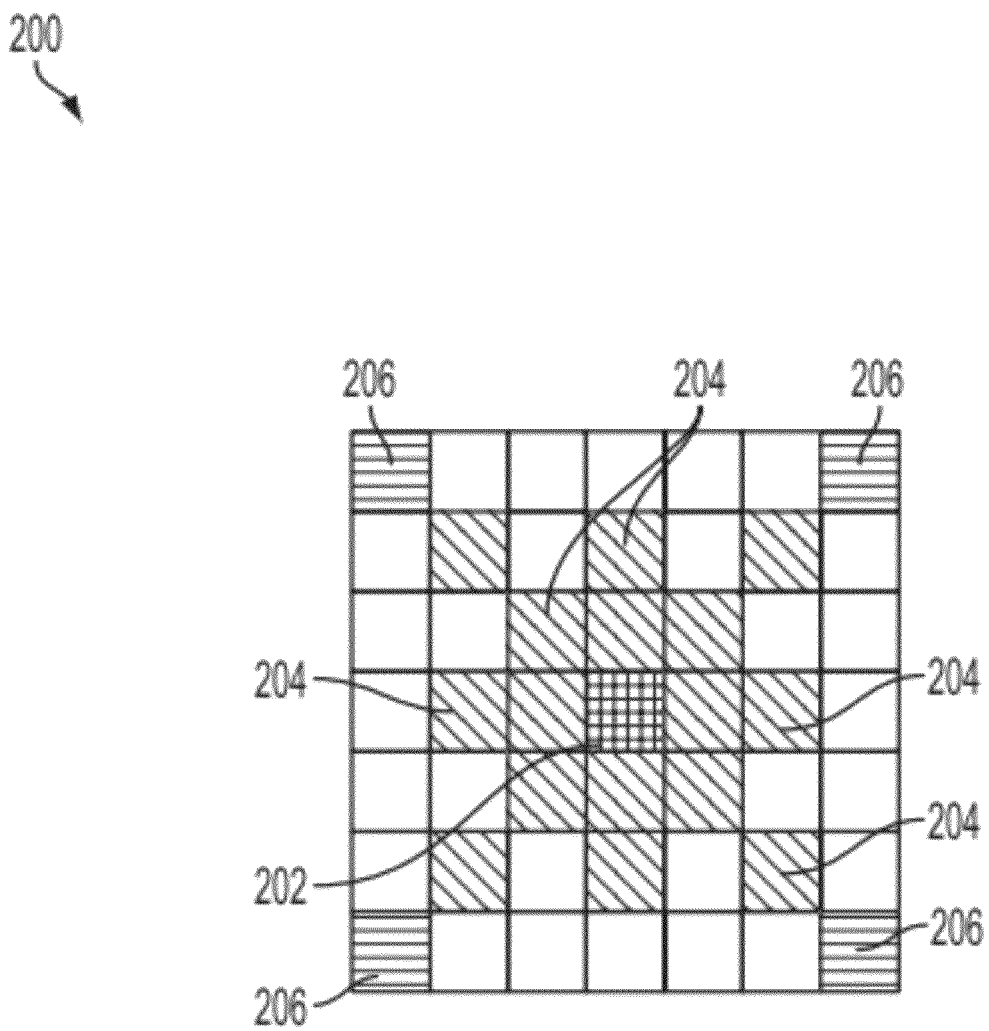
FIG. 2 illustrates an example of window used to process image data in accordance with an embodiment of the present disclosure.

FIG. 1a illustrates a method 100 for detecting a thin line in image data in accordance with an embodiment of the present disclosure. The method 100 begins when contone image data is received in step 102 via an input device. The input image data comprises a plurality of pixels of the contone domain. The image data is then processed using a processor (such as processing module 704 shown in FIG. 7) to determine the presence of thin lines. In particular, this disclosure describes an algorithm that uses a matrix to determine minimum and maximum values of pixels of image data, thresholds, and the like to thereby process the input image data and provide better output image quality. In an embodiment, the matrix may be viewed as a "window" that slides across and down an input image. An example of such a window is illustrated in FIG. 2, represented by element 200. As shown the window 200 may comprise a pixel of interest 202, i.e., the center pixel, that is to be processed/classified based on its neighboring pixels 204, 206 in the window 200, for example. Though a matrix or window of 7×7 is used herein as an example, matrices or windows of other sizes are also within the scope of this disclosure.

Figure 6:
Figure 7:
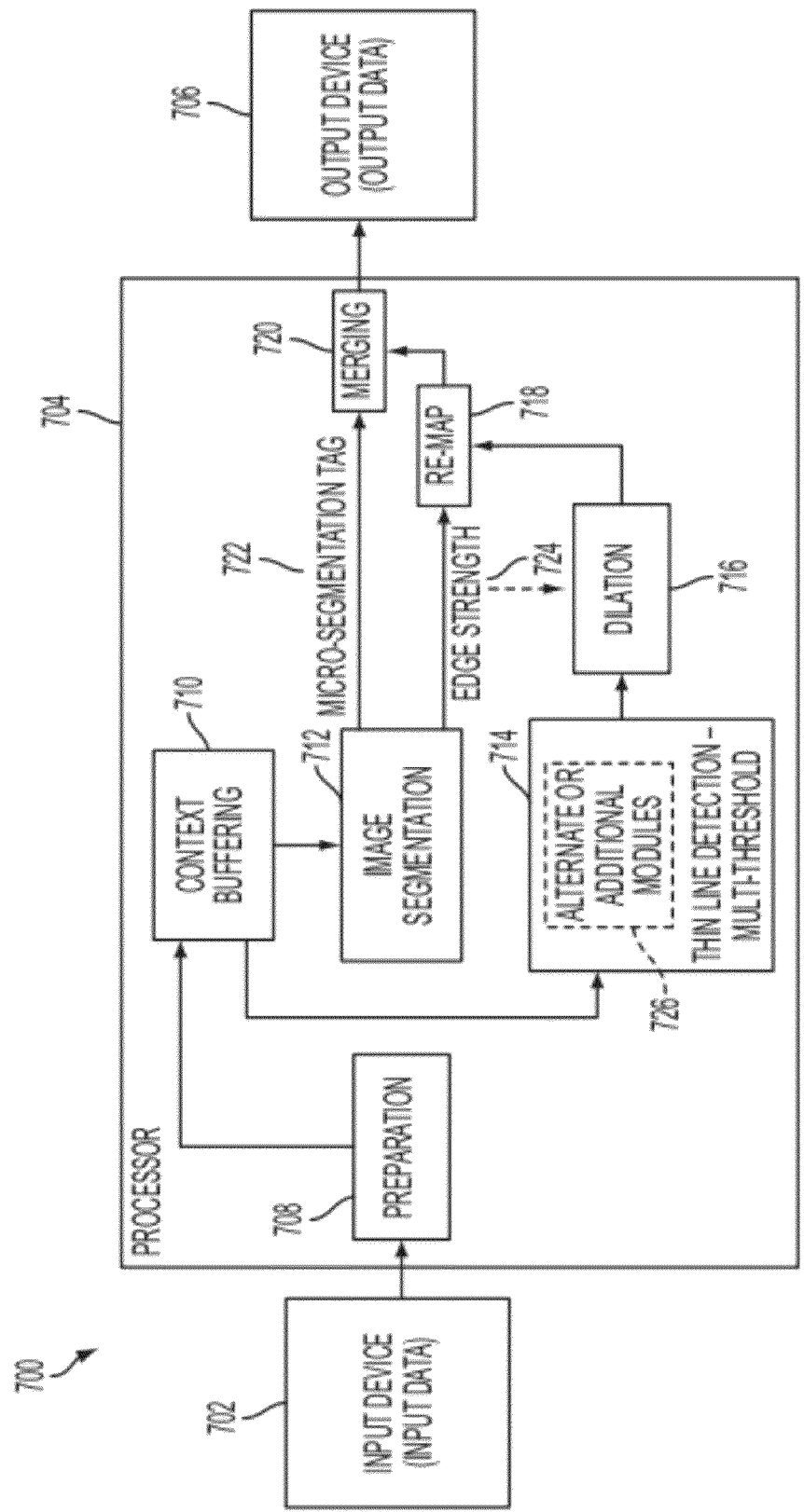
FIG. 7 illustrates an system that may be used to implement the method of FIG. 1a in accordance with an embodiment of the present disclosure.

As shown in FIG. 1 a, after receiving the contone image data in step 102, a window such as window 200 is established in step 104 by the processor. In some cases, such a window may be established by a multi-threshold thin line detection module 714 that is part of the processor, as shown in FIG. 7. The window 200 comprises the pixel of interest 202 (i.e., a center pixel) and neighboring pixels. The window 200 also comprises a plurality of predetermined regions. The number of regions for the window 200 should not be limiting. For example, in an example embodiment, the window may be divided into 9 regions, including an upper left region, an upper middle region, an upper right region, a bottom left region, a bottom middle region, etc. In some embodiments, the regions of the window may be determined based on the directionality for analyzing the image data in the window. For example, as shown and described with reference to FIGS. 2-6, multiple regions and directionalities may be analyzed for detecting a thin line.

After a window is established in 104, a minimum value and a maximum value in a selected subset of pixels in the window 200 is then determined in step 106 using a min-max module or the thin line detection module 714 (e.g., which may include a min-max module), for example, after a window is established in step 104. That is, in the illustrated 7×7 window 200, for example, there are 49 pixels provided for processing. A representative subset of pixels is chosen to determining a minimum value and a maximum value representative of the values in the window. The subset is chosen based on a possible location of a thin line. For example, a plurality of pre-determined locations or a pattern of pixels in the window 200 may be determined as the subset based on the expectation that, if the pixel of interest is on a thin line, then some of the pixels in the selected subset will have lower values and some will have higher values. In some cases, the subset of pixels may comprise a plurality of darker/black pixels and a plurality of lighter/white pixels therein. For example, if the pixel of interest is on a thin line, pixels of varying gray levels are expected in the subset. In some embodiments, the selected subset of pixels includes a plurality of pixels in a center region and corner pixels of the window. Alternatively, in a possible embodiment, the selected subset of pixels may comprise a plurality of pixels from window 200 that are selected at random.

FIG. 2 highlights an example embodiment showing the subset of pixels 204-206 used in minimum and maximum value calculation. The center pixel is identified as the pixel of interest 202. A plurality of pixels 204 in the window 200 are used to determine the minimum and maximum of the subset, and a plurality of corner pixels 206 are used to determine a maximum value for the four corners of the window 200. The subset of pixels 204-206 comprises a plurality of selected pixels in predetermined locations of interest (with respect to the thin line). This subset may include some of the darker pixels (i.e., lower value pixels) and some of the lighter/whiter pixels (i.e., higher value pixels) in the selected window 200. Of course, other ways of implementation are possible and within the scope of this disclosure.

Once the minimum and maximum values of the selected subset are determined in 106, the processor determines whether the following conditions are satisfied using the following formulas:

$$\text{maxOf5} \times 5 - \text{minOf5} \times 5 > \text{dif5} \times 5 \quad (1)$$

$$\max(\text{maxOf5} \times 5, \text{maxOf4Corners}) > \text{high7} \times 7 \quad (2)$$

Where:
maxOf5×5 is the maximum value of the subset of pixels 204;
minOf5×5 is the minimum value of the subset of pixels 204;
maxOf4Corners is the maximum value of the corner pixels 206;
dif5×5 is a value representing a predetermined difference; and
high7×7 is a value representing the background (white) pixels.

That is, the processor determines: a) if the difference between the minimum and maximum values is greater than a predetermined difference, and b) if the maximum value of the subset and corners is greater than a highest value. The comparison of the difference between the minimum and maximum values to the predetermined difference dif5×5 in condition (1) is performed to ensure that there is a possibility of a thin line within the window. For example, if the difference between the maxOf5×5 and minOf5×5 is a smaller value (i.e., the minimum and maximum values of the subset of pixels are close to each other) that is not greater than the predetermined difference dif5×5, it is determined that a thin line most likely does not exist in the thin window currently being processed. Therefore, for condition (1), one would generally expect the difference between the minimum and maximum values to be a high value that is greater than a predetermined value. For example, a value for the background (e.g., paper) may be a high value (e.g., 255), whereas a value for one or more pixels indicating the presence of a thin line may be a lower value (e.g., 30). This high value, therefore, would be greater than the predetermined difference dif5×5.

The highest value high7×7 is used to identify the background, i.e., white, pixels in the subset of pixels. Condition (2) verifies that the pixels being processed are provided on a background of white, or a value close to white. Condition (2) determines. a new maximum for evaluating the subset of pixels. Specifically, a maximum ("new maximum") of the maximum value of the subset of pixels 204 (i.e., maxOf5×5) and the maximum value of corner pixels 206 (i.e., maxOf4Corners) is determined. The new maximum is then compared to the highest value high7×7. It is generally expected that the highest value high7×7 will be approximately as high as the paper white value, and may be any value that represents the highest value of white (in the window). Thus, in order to ensure that the pixels are provided on a background of white, the new maximum must be higher that the highest value high7×7. The highest value high7×7 is chosen based on a threshold value where one might expect paper to register in value (e.g., 0 to 255). For example, if paper registers at a value of 253, 254, or 255, highest value high7×7 may be set at a threshold of 252, so that when compared to the new maximum, one is ensured that the possible thin line is on a white background.

In some cases, the highest value high7×7 may be the same value as the maximum value maxOf5×5. The highest value high7×7 may alternatively be the same value as the maximum of the four corners maxOf4Corners. Thus, the maximum value maxOf5×5 and/or maxOf4Corners and highest value high7×7 are equal. In an embodiment as noted above, condition (2) is not met, and the pixel of interest is not determined to be a part of the thin line (and so, a new pixel of interest may be chosen). However, it is envisioned in possible embodiments that condition (2) may be defined as max(maxOf5×5, maxOf4Corners)>=high7×7. In this case, an equal condition (i.e., max(maxOf5×5, maxOf4Corners)=high7×7) would satisfy condition (2) and thus further algorithm processing would be performed. Though a more satisfactory value for high7×7 would most likely be greater than maxOf4Corners by at least one gray level value, either determination may be used. More specifically, in some cases, threshold value(s) may be set accordingly to achieve the effect of maxOf5×5 being greater than threshold(s).

The difference dif5×5 and highest value high7×7 may be chosen based on what one would normally expect in a window having a thin line and background paper values. That is, the steps used in the method, or that are implemented by the system, may be a "smart" method or system, defined by its capability to use rules and logic to determine if the pixels/values are associated with a line or a background, and/or the like. In an example embodiment, the predetermined difference dif5×5 and the highest value high7×7 are each values that are pre-programmed and/or chosen based on experience (e.g., such as historical data). For example, one may anticipate ranges or values that are associated with darker/black pixels, as well as ranges or values that are associated with lighter/white pixels. Alternatively, in an embodiment, it is envisioned that the method (or system) may adapt to the image data that is received as input image data to determine the ranges or values that are associated with determining that the conditions are met. Any of these associations or anticipations may be used to assist in choosing the variables dif5×5 and high7×7. However, the methods or strategies for choosing such values for comparison in conditions (1) and/or (2) should not be limiting.

If conditions (1) and (2) are both met, the processing of the image data continues as described with reference to FIG. 1*a*. However, if conditions (1) and (2) are not met, processing of the image data does not continue. Rather, a new window is established (i.e., the window is traversed or moved across or down the image data), and the subset, minimum and maximum values, and conditions are evaluated for the new window with a new pixel of interest and its neighboring pixels. Each window is processed by determining these values and that these conditions (1) and (2) are met. By determining the minimum and maximum values based on a subset of pixels in each window, the present disclosure is capable of using variable or adaptive values when processing the image data. More specifically, when conditions (1) and (2) are satisfied, the minimum and maximum values of a window may be used to generate adaptive thresholds for further processing of the image data.

After step 106 and satisfying the conditions (1) and (2) associated therewith, the processor is then used in step 108 to determine a first set of thresholds for processing the pixel of interest and neighboring pixels in the window. The first set of thresholds comprises plurality of thresholds and is determined based on the minimum and maximum values of the window. For example, the processor uses the following formula:

$$\text{unit} = (\text{maxOf5} \times 5 - \text{minOf5} \times 5) >> 4$$

Where:
 unit is defined as an approximate range of pixel values in the window (based in the maximum and minimum values of the subset)

This formula is used to divide the difference of the maximum value maxOf5×5 and the minimum value minOf5×5 into a plurality of sections (e.g., 16), using a known mathematical method. Specifically, a unit comprises a number of ranges (as a result of dividing the difference between maxOf5×5 and minOf5×5) of pixel values. The unit is used to calculate the first set of thresholds., Because the unit is determined based on the minimum and maximum values, which are variable with respect to the values of the pixels in the window, the first set of thresholds also comprises multiple variable or adaptive thresholds. That is, the first set of thresholds for processing the pixel of interest and its neighboring pixels is variable as the window is moved along. the image data.

. In an example embodiment, the unit is used in step 108 to determine three. threshold values for thresholding the window of pixels (such as described below in step 110). For example, the first set of determined thresholds may include multiple thresholds such as a low threshold value, a mid threshold value, and a high threshold value. The first set may comprise a plurality of thresholds so that a range of values may be considered for determining that a thin. line is present in the window of image data.

In an embodiment, the following formulas are used to calculate the first set of thresholds:

$$\text{threshLow} = ((\text{maxOf5} \times 5 + \text{minOf5} \times 5) >> 1) + \text{factorLow} * \text{unit}$$

$$\text{threshMid} = ((\text{maxOf5} \times 5 + \text{minOf5} \times 5) >> 1) + \text{factorMid} * \text{unit}$$

$$\text{threshHigh} = ((\text{maxOf5} \times 5 + \text{minOf5} \times 5) >> 1) + \text{factorHigh} * \text{unit}$$

Where:
 factorLow is a low value that is used for determining a low threshold value
 factorMid is a middle or average value that is used for determining a middle threshold value
 factorHigh is a high value that is used for determining a high threshold value
 threshLow is a low threshold value that is used for processing the values of the pixels in the window
 threshMid is a middle or average threshold value that is used for processing the values of the pixels in the window
 threshHigh is a high threshold value that is used for processing the values of the pixels in the window Each of these formulas mathematically depicts that an average of the maximum value and minimum value of the selected subset of the window (i.e., the summation of maxOf5×5 and minOf5×5 is divided by two). A value is then added to this average to determine each of the thresholds in the first set. The value that is added is based on the previously calculated unit and the low, middle, and high factor values.

The low, middle, and high factor values used to determine the thresholds may each comprise values that are pre-programmed and/or chosen based on experience (e.g., such as historical data). As noted above, such values are variable. For example, the factor values may be chosen such that the multiple thresholds threshLow, threshMid, and threshHigh are based on an average or mean value of the subset of pixels, or based on a variation thereof.

For purposes of explanation only, one may consider the following: if a low or minimum value of the pixels is 50, and the high or maximum value of the pixels is 150, the average of these values is 100. The factor values may be manipulated or set such that the three (3) threshold values for processing the image data are: 75 (threshLow), 100 (threshMid), and 125 (threshHigh). This example illustrates that the multiple thresholds in this disclosure are used to increase flexibility for determining the presence of a thin line. This flexibility allows for not only better detection of thin lines, but also reduces or prevents false detection of lines (e.g., such as may be associated with processing halftone image data). Advantages such as these are further described below. Of course, any number of thresholds (e.g., 2, 3, 4, or more) may be used to determine the first set of thresholds and is not limited to those discussed herein.

The pixel of interest and neighboring pixels of the window are then thresholded in step 110 by the processing module using the first set of thresholds (e.g., threshLow, threshMid, and threshHigh). For example, in an embodiment, for each of the regions in the window, one or more of the thresholds may be applied to determine if a pixel value is greater than, equal to, or less than a determined threshold. Pixels that exceed or are greater than a threshold are defined as "on" pixels. Pixels that are less than a threshold are defined as "off" pixels. In some instances, if a pixel meets a threshold, it may be an "on" or "off" pixel. After applying the thresholds, step 112 then counts the number of "on" pixels in each of the predetermined regions of the window (for each threshold that is applied to that region).

In a sense, binary concepts are used to analyze the image data. For example, in a binary image, a pixel is either "on" or "off" (i.e., has a value of 1 for black, or 0 for white). In this case, the first set of thresholds is used to determine if a pixel in the window is "on" or "off," so that the "on" pixels may be counted. However, it should be noted that conversion of the image data contone to binary is not necessary. Rather, the concept of determining if a pixel is included or not included (i.e., yes or no) for further processing is applied during thresholding in step 110.

Additionally, it should be noted that the determination of "on" and "off" pixels in step 110 and the subsequent counting of step 112 is performed each time a threshold is applied to a region of the window. For example, if a first region of the window is thresholded using threshHigh and threshMid, two counts—one associated with the number of "on" pixels after applying the high threshold, and one associated with the number of "on" pixels after applying the middle threshold—are determined. Each region is evaluated to determine the pixels that may be associated with a specific location and orientation of a thin line (assuming the thin line exists).

In some cases, one of the thresholds may be applied to each region of the window. In some cases, two or more thresholds are applied to a region of the window. In an embodiment, each of the thresholds of the first set (e.g., threshLow, threshMid, threshHigh) may be associated with a specific region in the window.

For example, depending on an orientation or directionality of a line, one may consider that each of the regions of the window may exhibit specific pixel value characteristics (e.g., higher or lower values). As such, one may apply a threshold from the first set of thresholds to any number of the regions (e.g., one or more) in the window, or may limit applying the threshold to one or more regions. In an embodiment, as described below, by considering the possibility of directionality, the amount of processing time required to determine if a thin line exists in the window may be decreased. Of course, it should be noted that the directionality of the line need not be considered, and is not essential for implementation.

After counting the number of pixels in step 112, the counts are used to determine if a line is found in the window. Specifically, each counted number of pixels (for each associated region) is thresholded using a second set of thresholds in step 114. In an embodiment, the counted number of pixels may be compared to the second set of thresholds to determine if the two values are at least equal. The second set of thresholds may be pre-programmed and/or chosen based on experience (e.g., such as historical data). For example, one may anticipate ranges or values that are associated with pixels that represent a line. Alternatively, in an embodiment, it is envisioned that the method (or system) may adapt to the image data that is received. Any of these associations or anticipations may be used to assist in choosing .the second set of thresholds and should not be limiting.

Nonetheless, if it is determined that the counts meet or exceed the second set of thresholds, it may be determined that a thin line exists in the window in step 116. Thereafter, step 118 classifies the pixel of interest. Specifically, if it is determined that the thin line exists in step 116, and that the pixel of interest in the window is part of the thin line, the pixel of interest is classified as an edge pixel. Alternatively, the pixel of interest may be classified as a non-edge pixel if it is determined that a thin line does not exist in step 116, or if it is determined that the pixel of interest is not a part of the thin line. For example, it may be determined that a thin line does not exist in the window if the counted number of pixels does not meet the second set of thresholds. It may also be determined that the pixel of interest (i.e., center pixel) is not a part of the thin line (e.g., the thin line appears in a different region of the window).

. After classifying the pixel of interest in step 118, the processing of the image data may begin again by establishing a new window in step 102.

In some embodiments, the pixel of interest may be classified by a tag. Generally, the application of a tag to a pixel is known in the art. In this case, the tag may be used to aid in developing an edge map of the image data—i.e., map illustrating the pixels that are included in thin lines or edges throughout the image. A tag may indicate that a pixel is an edge pixel or a non-edge pixel. Tags may also only be used to indicate that the pixel is an edge pixel. However, such tagging of the image data need not be provided, and their indications need not be limiting.

Figure 1B:
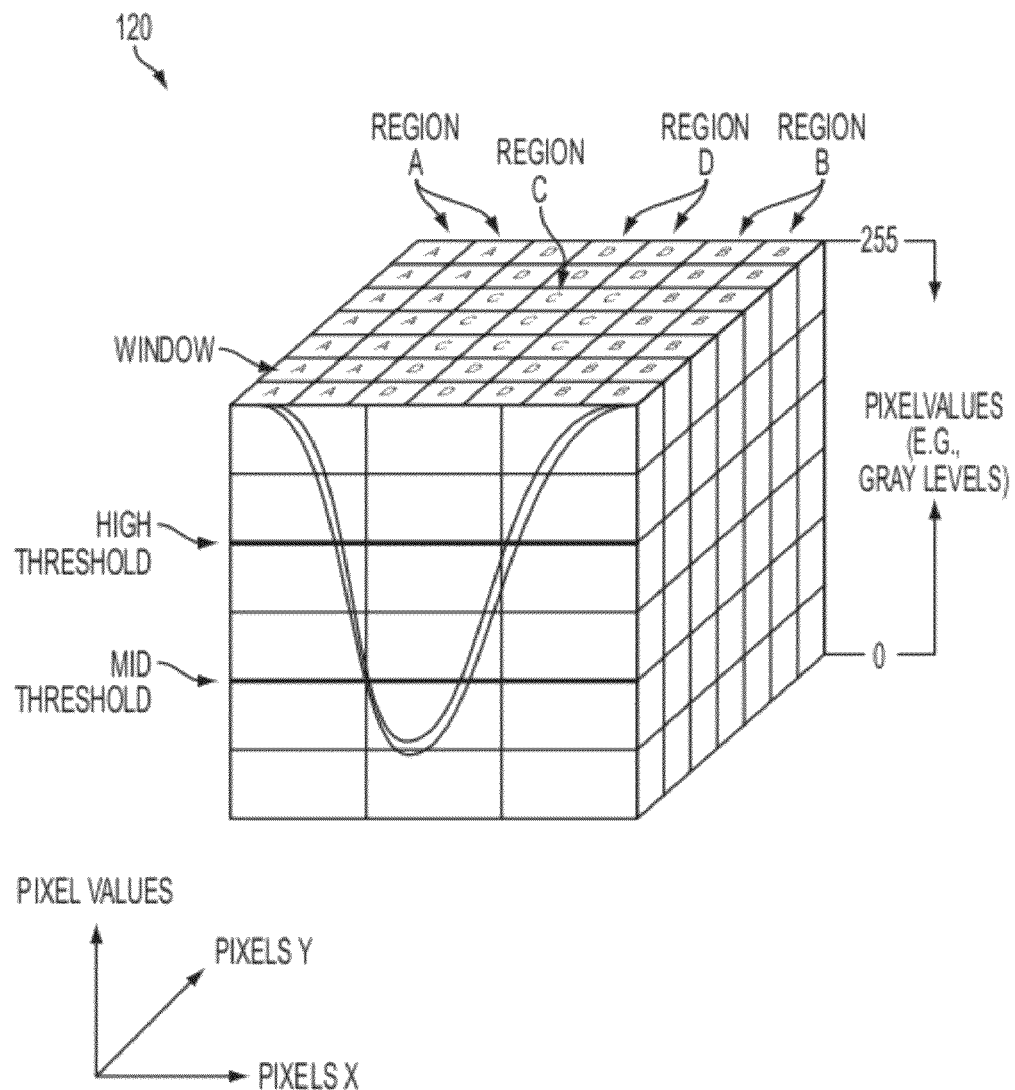

FIG. 1b illustrates a graphical representation of the method of FIG. 1a. Specifically, the graph 120 illustrates the relationship of the window, its regions, the first set of thresholds and the pixel values for determining the presence of a thin line in a window. The front face is a representation of what a cross section of a continuous tone 'vertical' thin line would like (as a reference). The diagram illustrates an embodiment showing how the particular threshold values and the design of the regions A, B, C, and D can be selected in a way that would identify a vertical thin line. That is, a vertical thin line would be suspected, for example, if there were a high number of pixels in Region A and Region B above the high threshold line, and high number of Region C and Region D pixels below the mid threshold line. As will become further evident, such regions may be edited/altered based on the type or orientation of the line being detected.

Though the directionality or orientation of the line need not be considered, FIGS. 3-6 illustrate examples of regions (each region labeled with one of the letters A-M) that may be used for processing the image data. More specifically, FIGS. 3-6 correspond to a window having a possible line orientation—vertical, horizontal, backward diagonal, and forward diagonally, respectively—and the regions associated therewith for processing and thresholding the pixels of image data. When the processing is being performed by the processor, the thresholds that are associated with the determination of each line orientation in the window may be applied in parallel manner, so that the operations are performed simultaneously.

The descriptions of FIGS. 3-6 illustrate a plurality of regions associated With the window with regard to line orientation, as well as describe example formulas that may be used to threshold the pixel of interest and its neighboring pixels (i.e., (using a first set of thresholds)) and to count a number of pixels in a region after thresholding, as described in steps 110 and 112 of method 100. Each of the windows 300-600 of FIGS. 3-6 depict the regions that are analyzed and are related to a possible line orientation. As such, in an embodiment, the regions of the window may be determined based on the probable location and directionality of the line.

For example, a window 200 may, comprise a plurality of regions X, Y, Z, and a center region. Each of the regions X, Y. Z, and the center may be thresholded using one or more of thresholds in the first set, and the pixels counted thereafter. The thresholding and counting of pixels may be repeated by processing the regions of data until it is determined if a line exists.

In an example embodiment, the processor uses the following equations to calculate the pixel counts in a window 200:

highXCount=number of pixels that are >=threshHigh in "X" region midXCount=number of pixels that are >=threshMid in "X" region highYCount=number of pixels that are >=threshHigh in "Y" region midYCount=number of pixels that are >=threshMid in "Y" region midZCount=number of pixels that are <threshMid in "Z" region lowZCount=number of pixels that are <threshLow in "Z" region Where:
  highXCount is a total count of the number of pixels that are greater than or equal to a first threshold (e.g., in the first set of thresholds, threshHigh) in an "X" region, the "X" region being a first region in the window
  midXCount is a total count of the number of pixels that are greater than or equal to a second threshold (e.g., in the first set of thresholds, threshMid) in the "X" region
  highYCount is a total count of the number of pixels that are greater than or equal to the first threshold (e.g., threshHigh) in a "Y" region, the "Y" region being a second region in the window
  midYCount is a total count of the number of pixels that are greater than or equal to the second threshold (e.g., threshMid) in the "Y" region
  midZCount is a total count of the number of pixels that are less than the second threshold (e.g., threshMid) in a "Z" region, the "Z" region being a third region in the window lowZCount is a total count of the number of pixels that are less than a third threshold in the first set of thresholds (e.g., threshLow) in the "Z" region These counts are then further thresholded, as described in step 114 of method 100, to determine if a thin line exists.

Figures 3, 4:
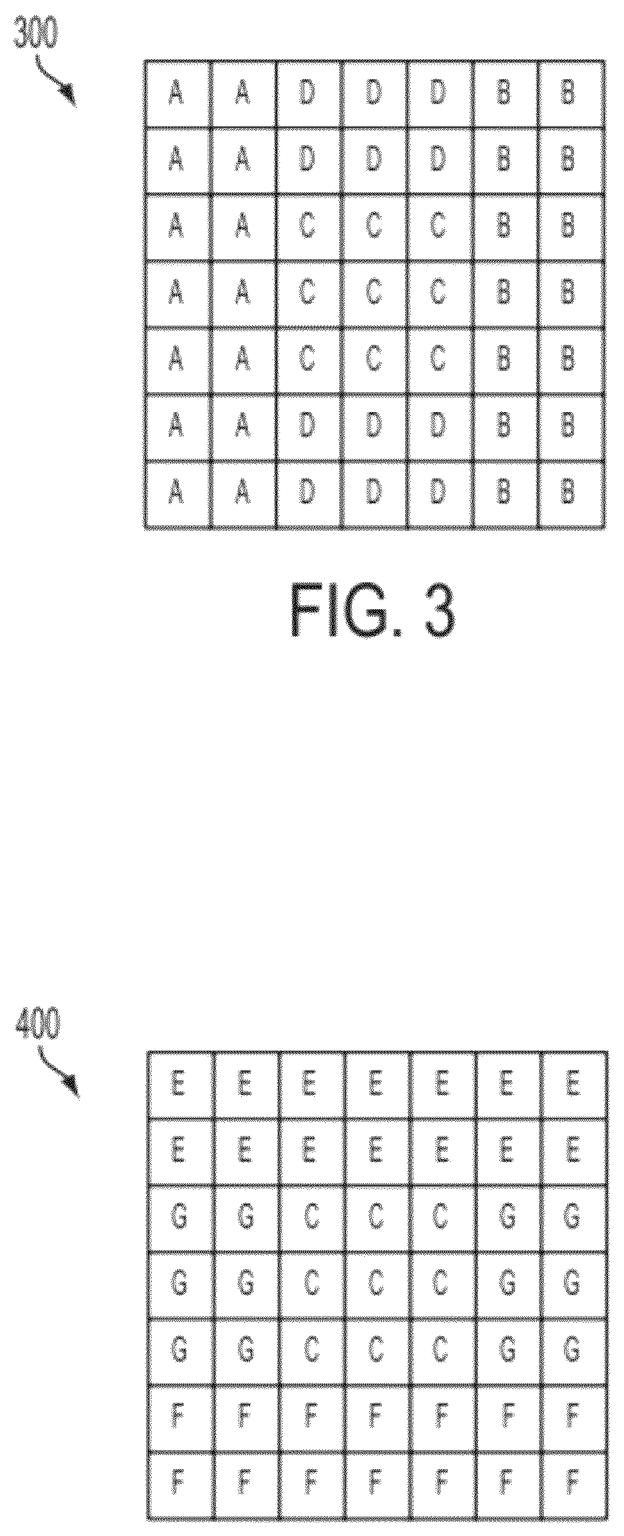

FIG. 3 illustrates a window 300 which is an example embodiment showing the designation of regions that may be processed for the 7×7 window 200 of FIG. 2. Specifically, the window 300 illustrates one example of the regions that may be analyzed to determine the presence of a vertical line. The regions are labeled, for clarity purposes only, using letters; specifically, window 300 is divided into regions A, B, C, and D. Each of the regions A, B, and D represent the plurality of regions of the window that may be analyzed in steps 110 and 112. Region A comprises the two left vertical columns of the window. Region B comprises the two right vertical columns of the window. Region D comprises the middle columns of the window, excluding the center region C. In this case, region D comprises a plurality of sections (e.g., upper and lower middle regions); however, as noted above, the number of regions for processing should not be limiting. Thus, in some embodiments, the upper middle section and lower middle section may be considered different regions. In any case, this window 300 depicts an example of the regions that may be analyzed to-determine a vertical line.

Figure 5:

In an example embodiment, the processor uses the following equations to calculate the pixel counts, the regions depicted in FIG. 3 being associated with the possible determination of a vertical line:

highACount=number of pixels that are >=threshHigh in "A" region midACount=number of pixels that are >=threshMid in "A" region highBCount=number of pixels that are >=threshHigh in "B" region midBCount=number of pixels that are >=threshMid in "B" region midDCount=number of pixels that are <threshMid in "D" region lowDCount=number of pixels that are <threshLow in "D" region Region C represents the center region of the window 300. As shown in FIGS. 4-6 as well, the location and size (e.g., number of pixels) of region C is common in all of the thresholding processes. Because the center region C is common to all of the possible orientations of a line, the center is processed and verified separately.

FIG. 4 illustrates a window 400 which is an example embodiment showing the designation of alternate regions E, F, G, and center region C of the window 200 that may be processed. Each of the regions E, F, G, C may be designated such that thresholding and counting may determine the presence of a line of horizontal orientation. In this embodiment, region E comprises the two top horizontal rows of the window. Region F comprises the two bottom rows of the window. Region G comprises the middle horizontal rows of the window, excluding the center region C.

In an example embodiment, the processor uses the following equations to calculate the pixel counts, the regions depicted in FIG. 4 being associated with the possible determination of a horizontal line:

highECount=number of pixels that are >=threshHigh in "E" region midECount=number of pixels that are >=threshMid in "E" region highFCount=number of pixels that are >=threshHigh in "F" region midFCount=number of pixels that are >=threshMid in "F" region midGCount=number of pixels that are <threshMid in "G" region lowGCount=number of pixels that are <threshLow in "G" region FIG. 5 illustrates a window 500 which is an example embodiment showing the designation of alternate regions H, I, J, and center region C of the window 200 that may be processed. Each of the regions H, I, J, C may be designated such that thresholding and counting may determine the presence of a line of backward diagonal ("\") orientation. In this embodiment, region H comprises a plurality of pixels in a lower left hand corner of the window. Region I comprises a plurality of pixels in an upper right hand corner of the window. Region J comprises the middle diagonal pixels of the window, in the upper left and lower right corners, excluding the center region C.

In an example embodiment, the processor uses the following equations to calculate the pixel counts, the regions depicted in FIG. 5 being associated with the possible determination of a backward diagonal line:

highHCount=number of pixels that are >=threshHigh in "H" region midHCount=number of pixels that are >=threshMid in "H" region highICount=number of pixels that are >=threshHigh in "I" region midICount=number of pixels that are >=threshMid in "I" region midJCount=number of pixels that are <threshMid in "J" region lowJCount=number of pixels that are <threshLow in "J" region FIG. 6 illustrates a window 600 which is an example embodiment showing the designation of alternate regions K, L, M, and center region C of the window 200 that may be processed. Each of the regions K, L, M, C may be designated such that thresholding and counting may determine the presence of a line of forward diagonal "/" orientation. In this embodiment, region K comprises a plurality of pixels in an upper left hand corner of the window. Region L comprises a plurality of pixels in a lower right hand corner of the window. Region M comprises the middle diagonal pixels of the window, in the lower left and upper right corners, excluding the center region C.

In an example embodiment, the processor uses the following equations to calculate the pixel counts, the regions depicted in FIG. 6 being associated with the possible determination of a forward diagonal line:

highKCount=number of pixels that are >=threshHigh in "K" region midKCount=number of pixels that are >=threshMid in "K" region highLCount=number of pixels that are >=threshHigh in "L" region midLCount=number of pixels that are >=threshMid in "L" region midMCount=number of pixels that are <threshMid in "M" region lowMCount=number of pixels that are <threshLow in "M" region Again, each of these steps may be processed by the processor simultaneously. As noted above, the pixels in the center region C are common to any or all of the possible line orientations in the window (see FIGS. 3-6). That is because, regardless of the orientation of a thin line, the center pixels C are generally the same, and therefore are counted only once. In this example embodiment, the center pixels comprise a 3×3 matrix of pixels located in the center of the window (i.e., nine (9) pixels). However, the number of center pixels may depend on how thin the line is that is being searched for. Thus, the number of center pixels C and size of the matrix used in the center pixel calculation may be altered or adjusted in some embodiments.

The center region C may be processed before, after, or concurrently with the multi-thresholding process of the regions in the window. That is, the center pixels C are thresholded using at least one of the thresholds in the first set of thresholds, and a total count of the number of pixels is determined. In some cases, the center region C may be thresholded using all of the thresholds in the first set. As an example, the following determinations are made using the processor:

midCCount=number of pixels that are <threshMid in "C" region lowCCount=number of pixels that are <threshLow in "C" region highCCount=number of pixels that are >threshHigh in "C" region FIGS. 3-6 illustrate that one may designate the regions for processing based on expectations. For example, in the case of vertical line detection, such as shown in FIG. 3, one would expect a higher number of counted pixels in regions A and B, and a lower number of counted pixels in regions C and D, if a representative vertical line running down the middle of the window is present. That is, a higher count of pixels in regions A and B indicate a plurality of background or white pixels, while a lower number of counts pixels in regions C and D may indicate the presence of darker or black pixels. Thus, the regions may be designated accordingly. FIGS. 3-6 illustrate examples of such regions. In some cases, the regions may assist in determining the presence of thin lines of alternate orientation. For example, the vertical line detection regions of FIG. 3 may assist in detecting lines that are not exactly vertical, but, perhaps, at a slight angle (e.g., 5 degrees from center). As such, the region designation, including the size of the matrix for the center region C, should not be limiting. In some cases, the regions may be adaptive based on the size of the window 200.

Nonetheless, the counts determined by thresholding the designated regions are further processed to calculate or detect the presence of the thin line. More specifically, the processor thresholds the counted number of pixels using the second set of thresholds, as noted by step 114. The second set of thresholds is used to determine that a thin line exists in the window. As noted above, the second set of thresholds may be pre-programmed and/or chosen based on experience (e.g., such as historical data). For example, for each possible line orientation, one may anticipate ranges or values that are associated with pixels that represent the line. In an embodiment, the second set of thresholds is compared/thresholded using the total counts associated with a specific line orientation. All of the thresholds of the second set must be met in order to determine the possibility of the presence of a thin line.

In an embodiment, the counted number of pixels may be thresholded, using the following second set of thresholds, to determine following condition is satisfied:

(3) If any one or more of these conditions are met, a thin line exists in at least one of the regions of the window:

Condition Set A highACount>=sideHighThresh midACount>=sideMidThresh highBCount>=sideHighThresh midBCount>=sideMidThresh midDCount+midCCount>=middleMidThresh lowDCount+lowCCount>=middleLowThresh midDCount>=twoEndVHMidThresh lowDCount>=twoEndVHLowThresh Condition Set B highECount>=sideHighThresh midECount>=sideMidThresh highFCount>=sideHighThresh midFCount>=sideMidThresh midGCount+midCCount>=middleMidThresh lowGCount+lowCCount>=middleLowThresh midGCount>=twoEndVHMidThresh lowGCount>=twoEndVHLowThresh Condition Set C highHCount>=cornerHighThresh midHCount>=cornerMidThresh highICount>=cornerHighThresh midICount>=cornerMidThresh midJCount+midCCount>=diagonalMidThresh lowJCount+lowCCount>=diagonalLowThresh midJCount>=twoEndDiaMidThresh lowJCount>=twoEndDiaLowThresh Condition Set D highKCount>=cornerHighThresh midKCount>=cornerMidThresh highLCount>=cornerHighThresh midLCount>=cornerMidThresh midMCount+midCCount>=diagonalMidThresh lowMCount+lowCCount>=diagonalLowThresh midMCount>=twoEndDiaMidThresh lowMCount>=twoEndDiaLowThresh Where:
sideMidThresh is a mid threshold value for a side region of the window
sideHighThresh is a high threshold value for a side region of the window
middleMidThresh is a mid threshold value for a middle region of the window
middleLowThresh is a low threshold value for a middle region of the window
diagonalMidThresh is a mid threshold value for a diagonal region of the window
diagonalLowThresh is a low threshold value for a diagonal region of the window
twoEndVHMidThresh is a mid threshold value for the sections of the middle region which are not located in the center of the region
twoEndVHLowThresh is a low threshold value for the sections of the middle region which are not located in the center of the region
twoEndDiaMidThresh is a mid threshold value for the sections of the diagonal region which are not located in the center of the region
twoEndDiaLowThresh is a low threshold value for the sections of the diagonal region which are not located in the center of the region
Condition Set A is associated with the presence of a vertical line
Condition Set B is associated with the presence of a horizontal line
Condition Set C is associated with the presence of a backward diagonal line
Condition Set D is associated with the presence of a forward diagonal line Condition (3) determines that a line is found in one or more of the regions in the window. For explanatory purposes only, condition (3) is broken down into four (4) sets. Each of the sets represents the criteria that must be met using the second set of thresholds for a corresponding line. If all of the thresholds are met in a condition set, it is determined that a line in the noted direction is possibly found.

It also should be noted that the second set of thresholds (e.g., sideMidThresh, sideHighThresh, middleMidThresh, middleLowThresh, diagonalMidThresh, diagonalLowThresh, twoEndVHMidThresh, twoEndVHLowThresh, twoEndDiaMidThresh, and twoEndDiaLowThresh) may be programmable and variable parameters. For example, the values of such parameters may be chosen based on experience (e.g., historical data) or based on the values that are present in the window. In some cases, however, the second set of thresholds may be adaptable or variable based on the number of pixels, window size, etc.

When the processor thresholds the counted number of pixels in step 114, the condition sets of condition (3) may be processed simultaneously. However, condition (3) does not necessarily specify what type of line is found, or that a line exists. Condition (3) determines if the surrounding regions A/B/D, E/F/G, H/I/J, and/or K/L/M satisfy the conditions/thresholds for indicating the presence of a line. Again, because the center region C is common to all of the possible orientations of a line, the total count of pixels for the center is thresholded separately. It is assumed that a thin line will most likely hit at least one of the center pixels. Therefore, to determine if a line exists in the window 200, such as noted in step 116 of the method 100, both the surrounding regions and the center region of the window must by thresholded and satisfy the conditions. Step 114 also includes thresholding the counted number of pixels in the center region C using the second set of thresholds.

The center region C may be processed using the second set of thresholds before, after, or concurrently with the thresholding process of the counted number of pixels. That is, the center pixels C are thresholded using at least one of the thresholds in the second set of thresholds, and it is determined if the condition is satisfied. In some cases, the center region C may be thresholded using all of the thresholds in the first set. As an example, the following condition is thresholded using the processor:

midCCount>=centerMidThresh lowCCount>=centerLowThresh highCCount<centerHighThresh             (4)

Condition (4) determines if center region is part of the possible thin line. If all of the thresholds are met, then condition (4) is true. Thus, it is identified that a thin line does exist in step 116. If one or none of the thresholds are satisfied in condition (4), then a thin line does not exist.

Thereafter, the pixel of interest (i.e., the center pixel) is classified, such as noted in step 118 of the method 100. Upon determination of the existence, orientation, and location of a line, the pixel of interest may be classified as an edge pixel. That is, the pixel of interest (i.e., center pixel) is classified as an edge pixel that is part of the thin line if it is determined that the thin line exists (condition (3)), and that the pixel of interest is part of the thin line (condition (4)). If one or none of conditions (3) or (4) are met, the pixel of interest is classified as a non-edge pixel.

The method as described in FIGS. 1a and 1b is used for all of the image data, i.e., as a sliding window, for the determination of thin lines throughout. This method may be used in combination with existing image segmentation algorithm to further define an output image, for example. Generally, this method provides a cost effective thin line detection algorithm that addresses the short comings of the known image segmentation methods. By combining features extracted from the contone domain and the thresholding methods to detect the thin line, a better quality (output) image is produced.

Figure 8:
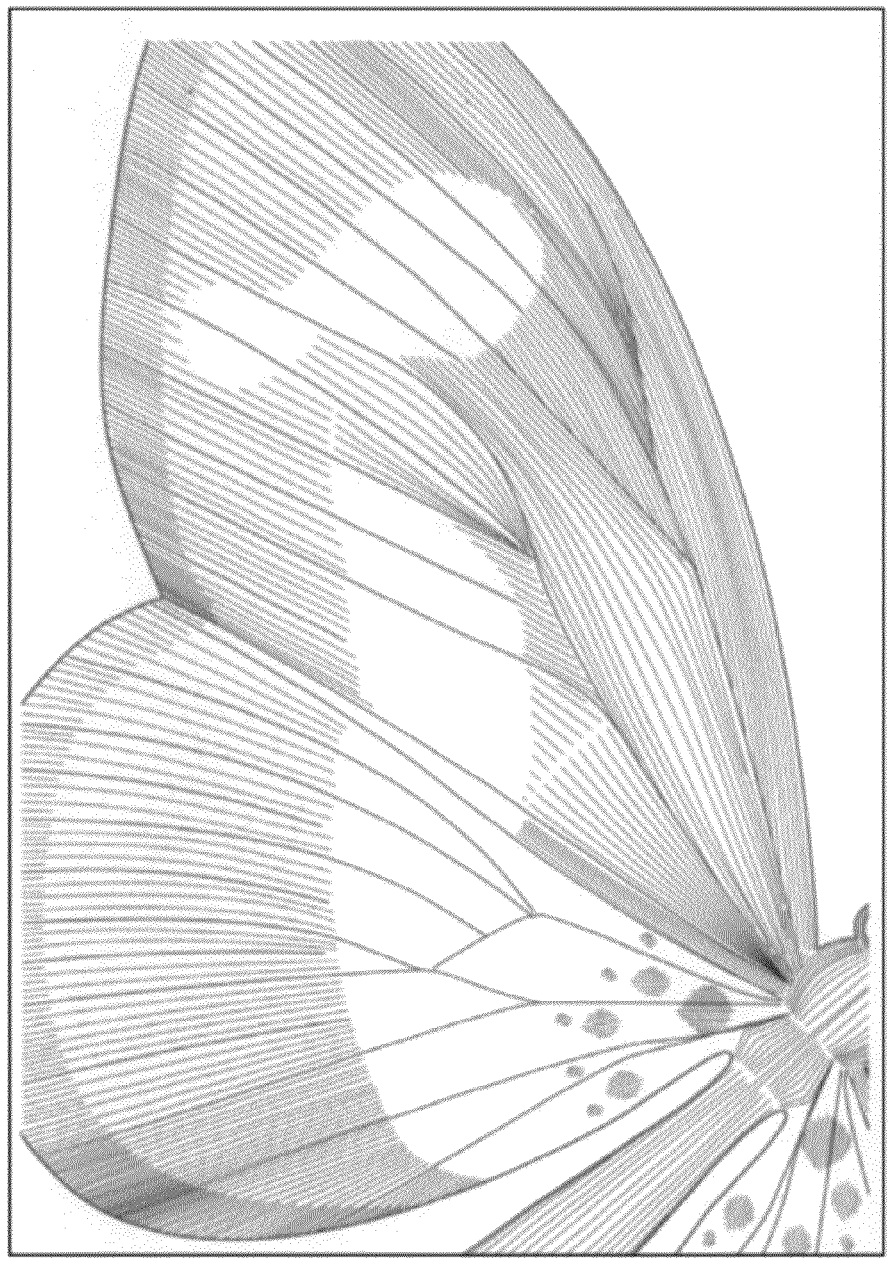
FIG. 8 shows an example of an input image that may be input for processing in accordance with an embodiment of the present disclosure.
Figure 10:
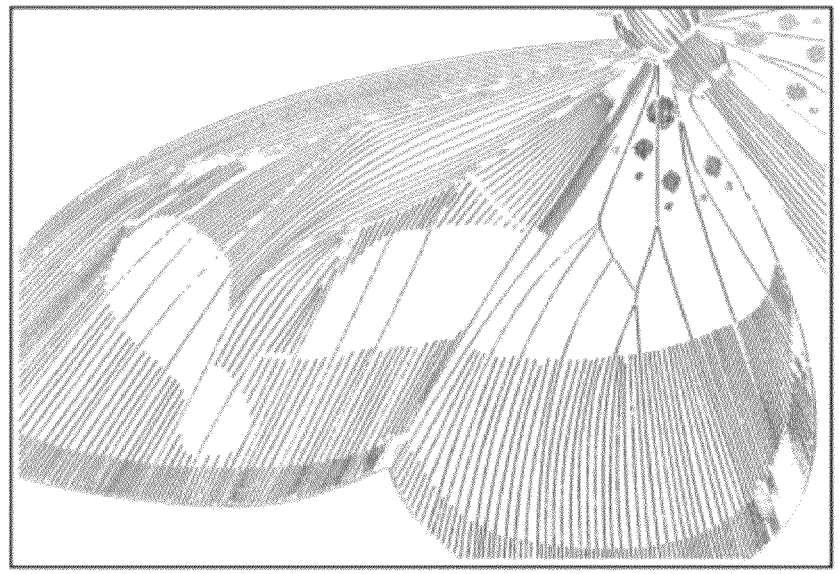
Figure 9:
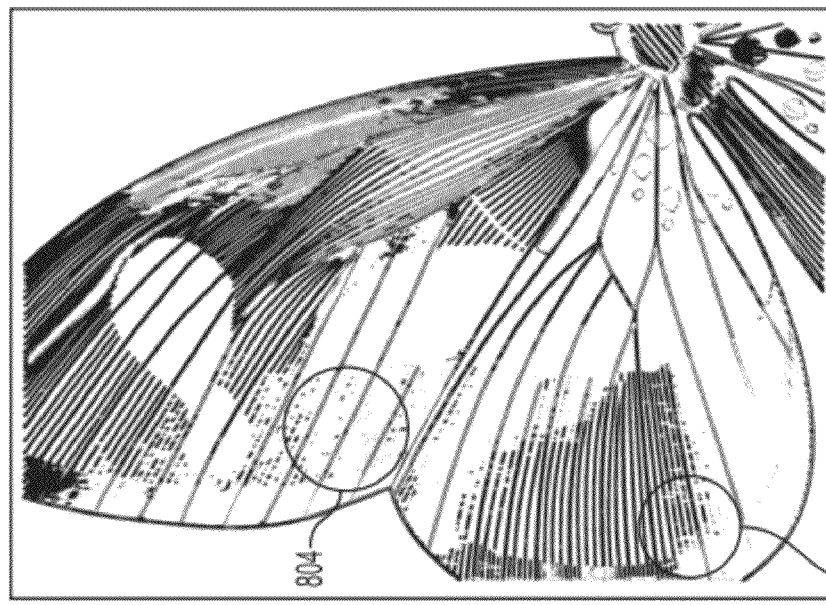
FIG. 9 illustrates an example of an edge map that may be generated after processing the input image of FIG. 8 using existing or prior segmentation methods.

Specifically, the algorithm or method has been proven effective in improving robustness of thin line detection over existing image segmentation methods. For example, the method 100 can detect thin lines missed by existing segmentation modules. FIG. 8 shows an example of an input image 800 that may be received. Using some existing segmentation algorithms, an edge map such as 802 may be generated. As shown by sections 804, 806 in FIG. 9, the edge map 802 may have degraded or missing pixels for some of the thin lines that are present in the original image 800. FIG. 9 illustrates how existing segmentation algorithms may detect pixels in halftone area as edge pixels, but on the other hand miss many true edge pixels in thin line region. Using the proposed method, the resultant edge and thin line detection is significantly improved, as illustrated by the image edge map (also called an segmentation tag map) in FIG. 10.

Figure 11:
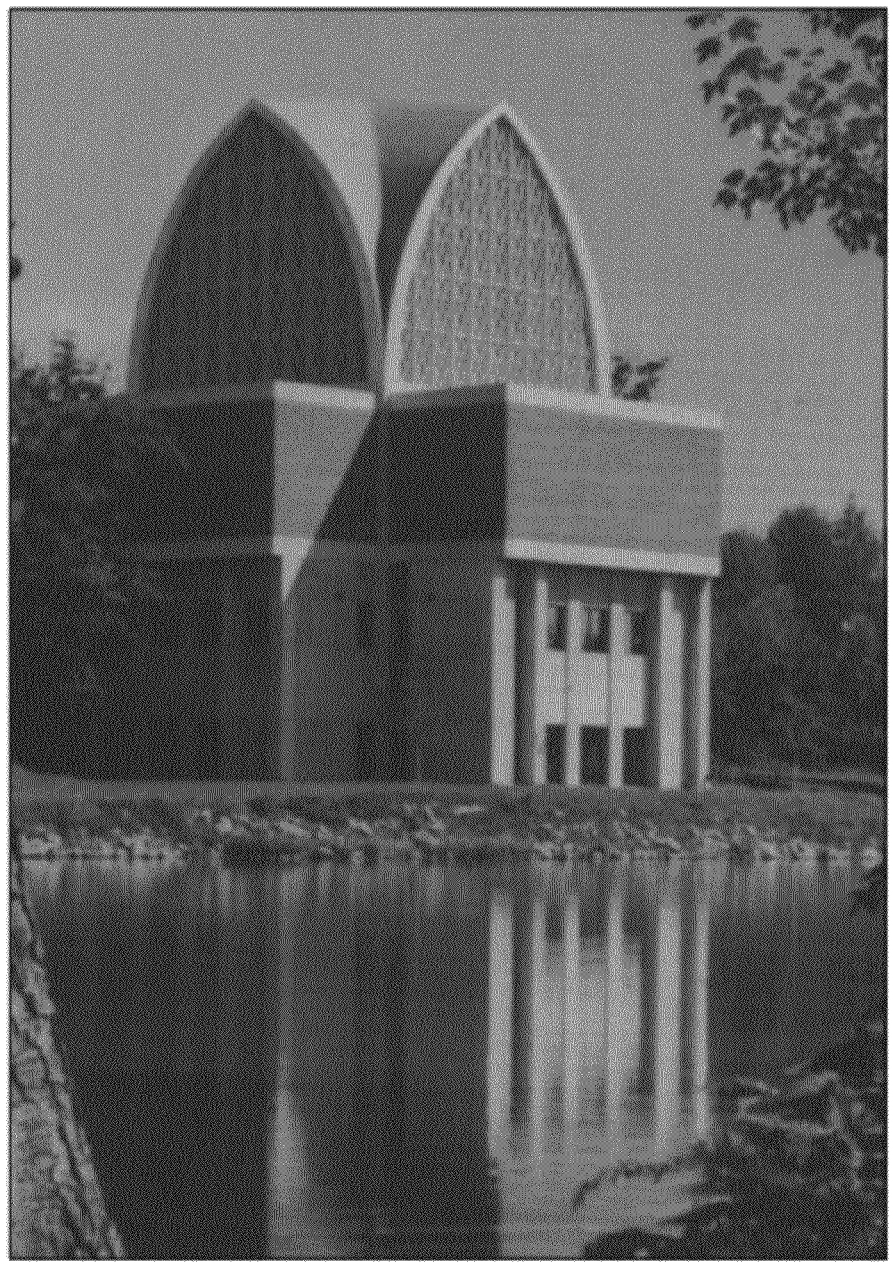
FIG. 11 shows an example of an input image that may be input for processing in accordance with an embodiment of the present disclosure.
Figure 13:
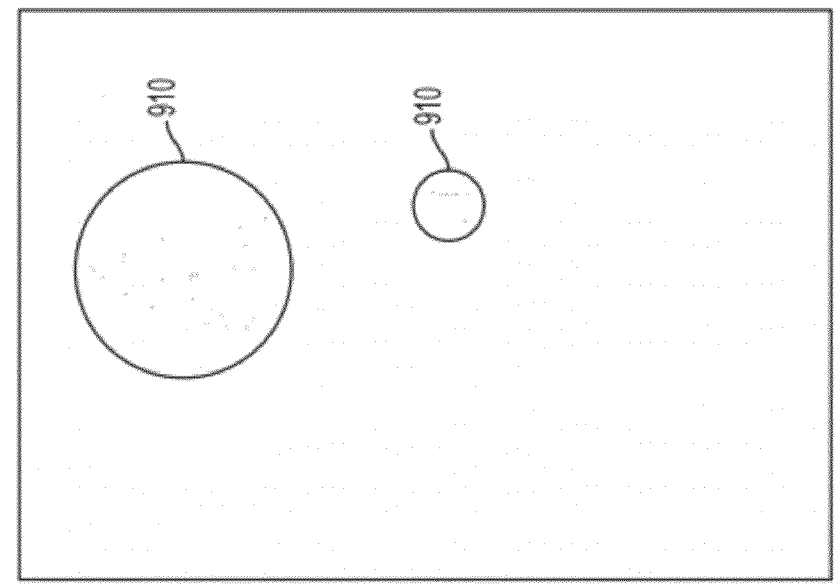
Figure 12:
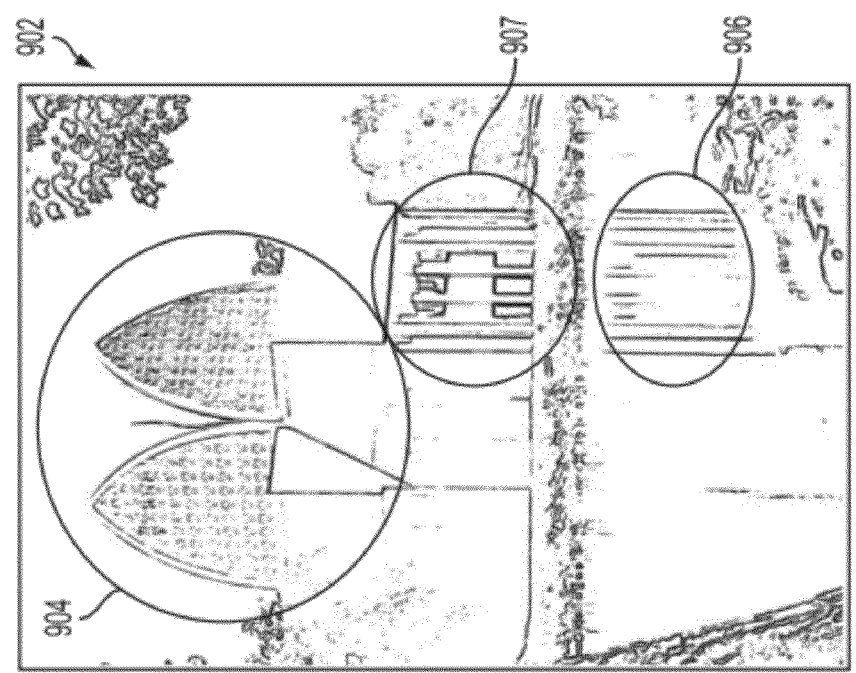
FIG. 12 illustrates an example of an edge map that may be generated after processing the input image of FIG. 11 using existing or prior segmentation methods.

Additionally, the noted algorithm or method 100 also allows for a less aggressive approach to edge detection, thus reducing or avoiding false alarms (e.g., adding a line where a line is not present). Such false alarms may be particularly noticeable when processing halftone image data, for example. FIG. 11 shows another example of an input image 900. Using some existing segmentation algorithms, an edge map such as 902 may be generated. As shown by sections 904, 906, and 907 in FIG. 12, the edge map 902 may have determined the presence of thin lines in the image data that are not present in the original image 900. In particular, FIG. 12 shows how existing segmentation algorithms may detect pixels in halftone area as edge pixels, indicating thin lines, when lines are not present. Using the proposed method, the resultant edge and thin line detection is significantly improved, and false thin lines are not output, as illustrated by the image edge map 908 in FIG. 13. For example, with the disclosed method, the edge map 908 of FIG. 13 identifies pixels 910 associated with a thin line, but false lines are not inserted.

FIG. 7 illustrates an example system 700, in accordance with an embodiment, that may be used to implement the proposed method and/or algorithm of FIG. 1a. It is to be understood that the image segmentation system 700 and method 100 as described herein may be implemented or processed using a number of devices, including a processor, computer, microprocessor, microcontroller, circuit elements, logic circuits or devices, as well as combinations of software and hardware, and should not be limited to those described herein. The system 700 may be, for example, a system for scanning, printing, faxing, copying, etc. or a system for combining such multiple functions, and should not be limiting.

As shown, the system 700 generally comprises an input device 702, a processing device or module 704, and an output device 706. The input device 702 may comprise an image input terminal (IIT) that is used to acquire or receive image data. For example, in some embodiments, the input device 702 may comprise a digital scanner or some other device for capturing image data. For example, image data may be capturing by a scanner in a copier, facsimile machine, a multi-function device (MFD), a camera, a video camera, or any other know or later device that is capable of scanning and/or capturing electronic image data. It should also be understood to one of ordinary skill in the art that image data may be received as input via Internet Protocol (IP), server, electronic communication (e.g., e-mail) or some other method or device, and/or that input device may be connected to a network, and that methods for receiving such data should not be limiting.

After input data or image data is received via an input device 702, the data is processed using the processing module 704. The processing module 704 may comprise a plurality of modules for processing the data for storage and/or output, for example. Though a plurality of modules for processing the data are shown and described, it should be noted that the types of modules and processes performed thereon should not be limited to those provided. For example, more or less devices may be used to perform the following processing functions. The processing operations may be carried out by hardware (e.g., FPGA or ASIC) or software components. For example, it should be noted that the system 700 may comprise one or more processors, and should not be limited. The one or more processors such as processing module 404 is capable of executing machine executable program instructions. In an embodiment, the processor is in communication with a bus (not shown). The system 700 may also include memory (not shown) that is used to store machine readable instructions to be executed by the processing module 704. The memory is capable of storing data used by or produced by the processing module 704. The type of memory should not be limiting; for example, the memory may alternatively include random access memory (RAM).

In the embodiment of FIG. 7, the image data sent from the input device 702 to a preparation module 708 of the processing module 702. Preparation module 708 may include performing functions on the input data such as noise reduction and pixel level mapping, for example. The data may then be processed by a context buffering module 710. Preparation module 708 and context buffering module 710 work in combination with an image segmentation module 712 as well. The image segmentation module 712 is used to classify pixels of the input image data into classes such as continuous tone (contone) of different levels or smoothness, halftones of different frequency, edge, background, etc. and may provided the classified data with micro-segmentation tags, as represented by element 722. Such a module may be an existing module or a module for performing such processes as is known in the art. Some image segmentation modules also compute and export features such as edge strength, as represented by element 724. In some cases, the image segmentation module 712 may include one or image segmentation modules for performing existing processes or techniques on the image data. Of course, it should be noted that image segmentation module 712 need not be used, nor present in the system 700. The image segmentation module 712 may apply known methods to image data as well, so that the combination of results produces a better quality output image.

In this case, the image segmentation module 712 is used in combination with a multi-threshold thin line detection module 714 to offer much improved results over existing segmentation modules. The multi-threshold thin line detection module 714 performs the method described above in FIG. 1a for determining thin lines in the image data. For example, the thin line detection module 714 is provided to establish a window and detect the minimum and maximum values, thresholds, and counting for determining if a thin line exists in the input data.

In some embodiments, additional or separate modules for performing the steps of the method may be provided in conjunction with or as a part of the thin line detection module. For example, in some cases, a min-max module, threshold module, and/or classification module, represented by element 726 may be a part of the thin line detection module 714.

The results or output from the multi-threshold thin line detection module 714 may be optionally dilated by a dilation module 716, as is generally known in the art. That is, the dilation module 716 may perform an efficient one-dimensional (1-D) dilation routine that is added to grow an edge map (e.g., in a fast scan process) which may improve the performance of image data enhancement routines. In some embodiments, if memory constraints are not limited, dilation can be performed in a slowscan direction, as well via a dilation kernel of any size.

Thereafter, the thin line detection results can be re-mapped using a re-mapping module 718. In some cases, the re-mapping may be based on an edge strength 724 that is reported by the image segmentation module 712. For example, the combination can be a simple 2-bit in/1-bit out look-up table. Alternatively, the edge strength 724 determined by the image segmentation module 712 may be used to control the dilation of the image data by the dilation module 716 and a combination of the thin line detection results. The thin line detection results may then be merged with the segmentation tag stream using a merging module 720. In some cases, a simple look-up table, as known in the art, may be used to provide flexibility in merging the documents. The processed image data may then be. output to an output device 706 such as a printer. The word "printer" encompasses any apparatus, such as a digital copier, bookmaking machine, facsimile machine, multi-function machine, etc. which performs a print outputting function for any purpose.

Other embodiments include incorporating the above steps into a computer program product comprising a computer-usable data carrier storing instructions that, when read and executed by a computer, cause the computer to perform a method 100 in an automated fashion. The instructions may be stored on a data carrier or otherwise a computer readable medium. For example, the method of FIG. 1 may be a chart of such computer readable instructions. For example, in some embodiments, memory or storage of a system 700 carrying computer readable instructions is configured such that when the computer readable instructions are executed by a computer or processing module 704, they cause a computer to automatically perform a method for detecting thin lines in image data.

According to an embodiment of the disclosure, the processing of image data is provided by system 700 in response to processing module 704 executing one or more sequences of one or more instructions contained in a memory (not shown). Such instructions may be read into the memory from another computer-readable medium, such as a storage device (which may or may not be a part of the memory). Execution of the sequences of instructions contained in the memory causes processing module 704 to perform the process steps of method 100 described herein. One or more processors in a multi-processing arrangement may also be employed to execute the sequences of instructions contained in the memory of the system 700. However, the embodiments of this disclosure are not limited to any specific combination of hardware and/or software.

The term "computer program product" as used herein refers to any product or medium that participates in providing instructions to processing module 704 for execution. Such a product may take many forms, including but not limited to, non-volatile media, volatile media, and transmission media. Common forms of computer program products or readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other product from which a computer can read. Also, various forms of computer products or media may be involved in carrying one or more sequences of one or more instructions to processing module 404 for execution, and should not be limiting.

While the principles of the disclosure have been made clear in the illustrative embodiments set forth above, it will be apparent to those skilled in the art that various modifications may be made to the structure, arrangement, proportion, elements, materials, and components used in the practice of this disclosure. For example, it is to be understood that in some embodiments, the multi-threshold thin line detection module 714 may be a module that is added to supplement an existing processing system or processor 704. Also, the claims can encompass embodiments in hardware, software, or a combination thereof.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for detecting thin lines in image data, the method comprising:
receiving contone image data via an input device, the image data comprising a plurality of pixels;
using a processor to process the image data and determine the presence of thin lines, the processing including:
establishing a window comprising a pixel of interest and neighboring pixels, the window comprising a plurality of predetermined regions;
determining a minimum value and a maximum value of a selected subset of pixels in the window;
thresholding the pixel of interest and neighboring pixels of the window using a first set of thresholds;
counting a number of pixels in each of the predetermined regions of the window after applying the first set of thresholds;
thresholding the counted number of pixels using a second set of thresholds;
determining if a thin line exists in the window based on the thresholding of the counted number of pixels; and
classifying the pixel-of interest as an edge pixel that is part of a thin line if it is determined that the thin line exists and that the pixel of interest is part of the thin line.

2. The method according to claim 1, wherein the method further includes:
tagging the pixel of interest as an edge pixel.

3. The method according to claim 1, wherein the method further includes:
tagging the pixel of interest as a non-edge pixel if it is determined that a thin line does not exist or that the pixel of interest is not a part of the thin line.

4. The method according to claim 1, wherein the processing includes determining the first set of thresholds based on the minimum and maximum values of the selected subset of pixels.

5. The method according to claim 1, wherein the method further includes, upon determining that a thin line exists, determining the orientation of the thin line within the window.

6. The method according to claim 5, wherein the orientation of the line is selected from the group consisting of: vertical, horizontal, forward diagonal, or backward diagonal.

7. The method according to claim 1, further comprising:
outputting the image data via an output device.

8. A system for detecting thin lines in image data, the system comprising:
an input device for receiving contone image data, the image data comprising a plurality of pixels;
a processor configured to process the image data and determine the presence of thin lines;
the processor comprising a thin-line detection module comprising code executable by the processor for performing a method comprising:
establishing a window comprising a pixel of interest and neighboring pixels, the window comprising a plurality of predetermined regions;
determining a minimum value and a maximum value of a selected subset of pixels in the window;
thresholding the pixel of interest and neighboring pixels of the window using a first set of thresholds;

counting a number of pixels in each of the predetermined regions of the window after applying the first set of thresholds;
thresholding the counted number of pixels using a second set of thresholds;
determining if a thin line exists in the window based on the thresholding of the counted number of pixels; and
classifying the pixel of interest as an edge pixel that is part of a thin line if it is determined that the thin line exists and that the pixel of interest is part of the thin line.

9. The system according to claim 8, wherein the thin-line detection module comprises code executable by the processor that is configured to determine an orientation of a thin line.

10. The system according to claim 8, further comprising: an output device for outputting the image data.

11. A non-transitory computer-readable medium storing instructions that, when executed by a computer, cause the computer to perform a method comprising:
establishing a window comprising a pixel of interest and neighboring pixels, the window comprising a plurality of predetermined regions;
determining a minimum value and a maximum value of a selected subset of pixels in the window;
thresholding the pixel of interest and neighboring pixels of the window using a first set of thresholds;
counting a number of pixels in each of the predetermined regions of the window after applying the first set of thresholds;
thresholding the counted number of pixels using a second set of thresholds;
determining if a thin line exists in the window based, on the thresholding of the counted number of pixels; and
classifying the pixel of interest as an edge pixel that is part of a thin line if it is determined that the thin line exists and that the pixel of interest is part of the thin line.

12. The non-transitory computer-readable medium according to claim 11, wherein the method performed by the computer further includes: determining the first set of thresholds based on the minimum and maximum values of the selected subset of pixels.

13. The non-transitory computer-readable medium according to claim 11, wherein the method performed by the computer further includes: upon determining that a thin line exists, determining the orientation of the thin line within the window.

* * * * *